United States Patent [19]

Romero

[11] Patent Number: 4,538,435

[45] Date of Patent: Sep. 3, 1985

[54] STEERING COLUMN LOCK FOR HEAVY-DUTY VEHICLES

[76] Inventor: Hector B. Romero, 1173 Socorro Ct., San Diego, Calif. 92129

[21] Appl. No.: 493,935

[22] Filed: May 12, 1983

[51] Int. Cl.³ .................... B60R 25/02; E05B 65/12
[52] U.S. Cl. .................... 70/183; 70/212; 70/237
[58] Field of Search .......... 70/187, 14, 181, 212, 70/183–185, 237

[56] References Cited

U.S. PATENT DOCUMENTS

| | | |
|---|---|---|
| 112,910 | 3/1871 | Essex .................. 70/183 X |
| 1,199,559 | 9/1916 | Jones . |
| 1,312,204 | 8/1919 | Price . |
| 1,333,878 | 3/1920 | Smith .................. 70/253 |
| 1,346,763 | 7/1920 | Morris . |
| 1,349,490 | 8/1920 | Broomhead .......... 70/183 |
| 1,377,124 | 5/1921 | Godbey, Jr. . |
| 1,426,534 | 8/1922 | Baker . |
| 1,464,908 | 8/1923 | Kettering . |
| 1,502,933 | 7/1924 | Allen . |
| 1,520,600 | 12/1924 | Robbins . |
| 1,790,427 | 1/1931 | Kirton . |

FOREIGN PATENT DOCUMENTS

| | | | |
|---|---|---|---|
| 635008 | 8/1936 | Fed. Rep. of Germany ........ 70/183 |
| 504729 | 7/1920 | France .................. 70/183 |

*Primary Examiner*—Gary L. Smith
*Assistant Examiner*—Thomas J. Dubnicka
*Attorney, Agent, or Firm*—Baker, Maxham, Callan & Jester

[57] ABSTRACT

A steering column lock for heavy-duty vehicle steering columns includes a one-piece substantially T-shaped member having a main stem portion and a cross bar portion. The wheels of the vehicle are turned and the stem portion is inserted through the opening in the universal joint in the steering column. The cross bar portion interferes with adjacent structure such as the steering column support. A heavy-duty padlock is inserted through an opening toward the end of the stem portion opposite the cross bar portion. A crown is provided at the top of the cross bar portion to cause further interference when trying to rotate the steering column.

1 Claim, 3 Drawing Figures

STEERING COLUMN LOCK FOR HEAVY-DUTY VEHICLES

BACKGROUND OF THE INVENTION

The present invention relates to a steering column lock for heavy-duty vehicles.

The theft of trucks has increased substantially in recent years. The tractor with an empty trailer attached can have a value in excess of a quarter of a million dollars. Even though these items are large and not easy to hide, they are the subject of continually increasing thievery. The truck and trailers are very valuable and in addition radio equipment and cargo adds to the value. When truck drivers go for coffee or a meal, they often leave the truck engine running to keep diesel fuel from gelling and to keep the track cab warm in cooler climates. When a theft occurs, the cargo is lost with a great resulting loss to the trucking operation and to the customer both in time and money. The same type of problem occurs with large and valuable motor homes. These vehicles are expensive and include much valuable equipment. The thieves usually strip down the vehicles and sell the parts. The cargo and equipment is generally sold apart from the vehicle.

SUMMARY

The device of the present invention solves the problem with a simple and sturdy construction that can be manufactured at low cost. It is easy to use and can be quickly applied. The device comprises a substantially T-shaped one-piece element of heavy steel stock comprising a stem and cross bar with a small extension on the crown. The stem of the element is inserted through the opening in a universal joint in the steering column. The stem of the device includes openings and a heavy-duty padlock is inserted through one of these openings after the stem portion is inserted through the steering column universal joint. The cross bar and padlock hold the element in place and the cross bar and projection interfere with adjacent structure and prevent turning of the vehicle wheels.

DETAILED DESCRIPTION OF THE INVENTION

Figure 1:
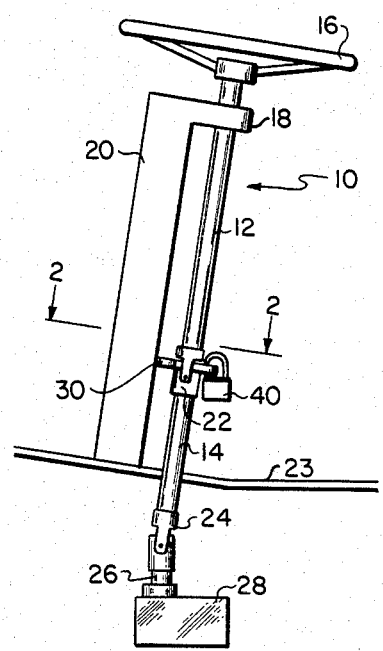
FIG. 1 is a side elevation of a steering column for a heavy-duty vehicle showing the steering column lock of the present invention in place.

The drawings show a steering arrangement for a heavy-duty vehicle such as a truck or mobile home. It includes a steering column 10 comprised of a top rod 12 and a bottom rod 14. The top rod 12 is affixed to a steering wheel 16 and is supported in position by a yoke 18 extending from a steering column support 20. The lower end of the top rod 12 is fixed to one end of a universal joint 22. The upper end of the bottom rod 14 extends through the vehicle floor 23 and is fixed to the other end of universal joint 22.

The lower end of bottom rod 14 is connected to one end of universal joint 24. The other end of universal joint 24 is connected to the steering shaft 26 which works through gear box 28 to steer the vehicle.

The locking device of the present invention is shown at 30. It includes a generally T-shaped one piece element that includes a stem 32 and a cross bar 34. The device is made of one-half inch hardened steel plate. A projection 36 is formed on the cross bar 34 and holes 38 are provided in the free end of the stem 32.

Figure 2:
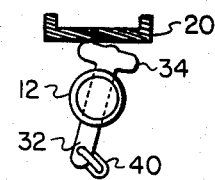
FIG. 2 is a view taken along the line 2—2 of FIG. 1.
Figure 3:
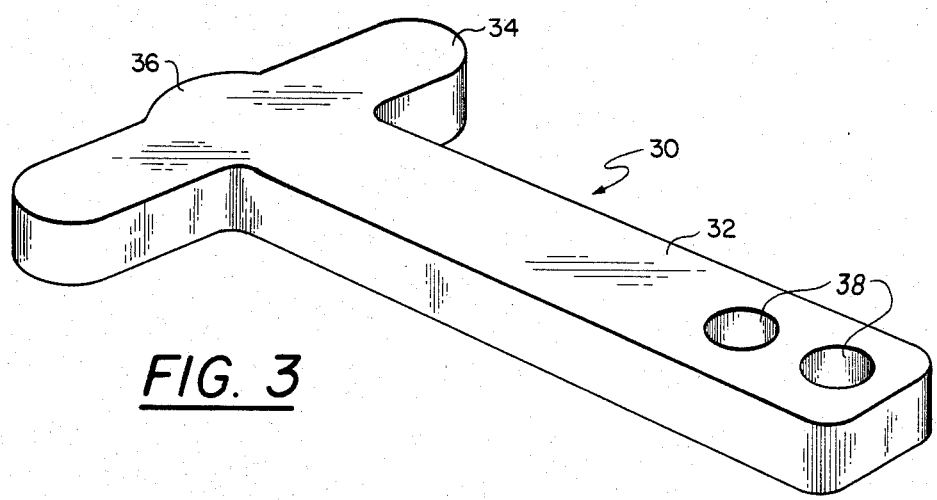
FIG. 3 is a perspective view of the steering column lock of the present invention.

The device is used as follows. The steering wheel 16 is rotated to turn the front wheels of the vehicle. The stem 32 of the locking device 30 is inserted through the opening in the universal joint 22 as shown in FIGS. 1 and 2. A heavy-duty padlock 40 is inserted through one of the holes 38 and locked in place. If someone attempts to turn the steering wheel 16, the cross bar 34 and projection 36 move against the steering column 20 and the front wheels of the vehicle cannot be moved.

If desired, the device can be formed of a size to fit in the lower universal joint 24 so that it interferes with adjacent structure of the vehicle. It can be inserted through the opening in the universal joint 24 after the vehicle wheels are turned to facilitate access to the lower universal joint. Where the shafts are at any substantial angle at the universal joint, the shank 32 will obviously prevent the shafts from rotating by interfering with the pivoting action of the universal joint during its rotation.

A device that has proven successful with the upper universal joint has the following dimensions. Overall length from the free end of the stem to the end of the projection is about five and three-quarter inches to eight and one-quarter inches. Width of stem is about one inch. Width of cross bar is about three-quarters of an inch wide and length is about three and one-half inches. Projection extends about one-half inch. Holes are about one-half inch in diameter. Thickness of the device is about one-half inch.

The locking device of the present invention is simple and easy to use. It is chrome plated and has an attractive appearance. It is not cumbersome and can be quickly applied.

Having thus described my invention, I claim:

1. A steering column lock assembly, comprising in combination:

a steering shaft mounted for rotation on closely adjacent support structure in a motor vehicle, said shaft having an openly accessible universal joint;

a one-piece substantially T-shaped element constructed of one-half inch hardened steel plate having a stem portion for insertion through an opening in the universal joint of said steering shaft and having a cross bar portion at one end of said stem portion, and a plurality of transverse bores extending through the end of said stem portion opposite the cross bar portion for selectively receiving heavy-duty padlock means; and said heavy-duty padlock means including a padlock for inserting through a selected one of the bores in said stem portion after the stem portion is inserted through the opening of the universal joint to position the cross bar portion on the opposite side of the universal joint from the bores;

so that one of said cross bar portion and said stem portion interference with rotation of said shaft by any one of engagement with adjacent vehicle structure such as the steering column support, or engagement with pivoting universal joint structure to prevent pivoting of the universal joint for preventing rotation of the steering column.

* * * * *